(12) United States Patent
Danielson et al.

(10) Patent No.: US 11,556,452 B2
(45) Date of Patent: Jan. 17, 2023

(54) SYSTEM FOR SOFTWARE COMPILER INTEGRITY VERIFICATION

(71) Applicant: BANK OF AMERICA CORPORATION, Charlotte, NC (US)

(72) Inventors: Christopher L. Danielson, Poway, CA (US); Robert Justin Brown, Santa Monica, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/219,520

(22) Filed: Mar. 31, 2021

(65) Prior Publication Data

US 2022/0318127 A1    Oct. 6, 2022

(51) Int. Cl.
| | |
|---|---|
| G06F 8/53 | (2018.01) |
| G06F 11/36 | (2006.01) |
| G06F 8/41 | (2018.01) |
| G06F 21/57 | (2013.01) |
| G06F 8/65 | (2018.01) |

(52) U.S. Cl.
CPC ............ G06F 11/3608 (2013.01); G06F 8/44 (2013.01); G06F 8/53 (2013.01); G06F 8/65 (2013.01); G06F 21/57 (2013.01); *G06F 2221/034* (2013.01)

(58) Field of Classification Search
CPC ..... G06F 8/41; G06F 8/44; G06F 8/53; G06F 11/3608; G06F 11/3688
See application file for complete search history.

(56) References Cited

U.S. PATENT DOCUMENTS

| | | | |
|---|---|---|---|
| 8,893,155 | B2 | 11/2014 | Warren et al. |
| 9,176,769 | B2 | 11/2015 | Raghunathan et al. |
| 9,229,698 | B2 | 1/2016 | Marathe |
| 9,477,412 | B1 | 10/2016 | Amar et al. |
| 9,483,235 | B2 | 11/2016 | Murphy et al. |
| 9,501,269 | B2 | 11/2016 | Rodgers et al. |
| 9,529,622 | B1 | 12/2016 | Adda et al. |
| 9,547,553 | B1 | 1/2017 | Khermosh et al. |
| 9,619,364 | B2 | 4/2017 | Venkataraman |
| 9,632,936 | B1 | 4/2017 | Zuckerman et al. |
| 9,639,473 | B1 | 5/2017 | Adda et al. |
| 9,678,787 | B2 | 6/2017 | Wen et al. |
| 2008/0168426 | A1 * | 7/2008 | Mitran ................ G06F 11/3688 717/126 |

(Continued)

*Primary Examiner* — Duy Khuong T Nguyen
(74) *Attorney, Agent, or Firm* — Moore & Van Allen PLLC; Anup Shrinivasan Iyer

(57) ABSTRACT

Systems, computer program products, and methods are described herein for software compiler integrity verification. The present invention is configured to retrieve, from a source code repository, a source code; process, using a first build machine, the source code into a first object code; process, using a second build machine, the source code into a second object code; initiate an integrity verification engine on the first object code and the second object code; decompile, using the integrity verification engine, the first object code to create a first decompiled object code and the second object code to create a second decompiled object code; compare the first decompiled object code with the second decompiled object code; determine a match between the first decompiled object code and the second decompiled object code; and transmit an approval notification.

20 Claims, 3 Drawing Sheets

(56) References Cited

U.S. PATENT DOCUMENTS

| | | |
|---|---|---|
| 2011/0276789 A1 | 11/2011 | Chambers et al. |
| 2011/0314458 A1 | 12/2011 | Zhu et al. |
| 2013/0247046 A1 | 9/2013 | Asai et al. |
| 2013/0300752 A1 | 11/2013 | Grover et al. |
| 2014/0007060 A1 | 1/2014 | Warren et al. |
| 2014/0026111 A1 | 1/2014 | Stitt et al. |
| 2014/0068768 A1* | 3/2014 | Lospinuso ............ G06F 21/561 726/23 |
| 2014/0149969 A1 | 5/2014 | Brower et al. |
| 2014/0244968 A1 | 8/2014 | Greyzck et al. |
| 2015/0169304 A1 | 6/2015 | Angerer et al. |
| 2016/0011857 A1 | 1/2016 | Grover et al. |
| 2017/0169223 A1* | 6/2017 | Lin ....................... G06F 21/563 |
| 2018/0211046 A1* | 7/2018 | Muttik ................ G06F 9/30058 |
| 2022/0198003 A1* | 6/2022 | Shaver ...................... G06F 8/70 |

* cited by examiner

SYSTEM FOR SOFTWARE COMPILER INTEGRITY VERIFICATION

FIELD OF THE INVENTION

The present invention embraces a system for software compiler integrity verification.

BACKGROUND

Most software testing, including source code security and integrity testing, implemented during the software developmental lifecycle happens earlier in the development lifecycle. This is done so that development teams may be able to discover significant problems, including architectural flaws in the source code before they become too expensive to fix. However, implementing source code security and integrity testing earlier in the development lifecycle may leave the source code vulnerable to misappropriation during later stages of the development lifecycle, such as the code compilation process. There is a need for a system for software compiler integrity verification.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for software compiler integrity verification is presented. The system comprising: at least one non-transitory storage device; and at least one processing device coupled to the at least one non-transitory storage device, wherein the at least one processing device is configured to: retrieve, from a source code repository, a source code; process, using a first build machine, the source code, wherein processing further comprises compiling the source code into a first object code; process, using a second build machine, the source code, wherein processing further comprises compiling the source code into a second object code; initiate an integrity verification engine on the first object code and the second object code; decompile, using the integrity verification engine, the first object code to create a first decompiled object code; decompile, using the integrity verification engine, the second object code to create a second decompiled object code; compare the first decompiled object code with the second decompiled object code; determine that the first decompiled object code matches the second decompiled object code; and transmit an approval notification to a computing device of a user indicating that the first decompiled object code matches the second decompiled object code, wherein the second build machine is configured to operate in an isolated network environment with limited networking and access thereto.

In some embodiments, the at least one processing device is further configured to: determine that the first decompiled object code does not match the second decompiled object code; and transmit an alert notification to the computing device of the user indicating that the first decompiled object code does not match the second decompiled object code.

In some embodiments, the at least one processing device is further configured to: compare the first object code with the second object code, wherein the first object code and the second object code are in binary form; determine a match between the first object code and the second object code; and transmit the approval notification to the computing device of the user indicating that the first object code matches the second object code.

In some embodiments, the at least one processing device is further configured to: determine that the first object code does not match the second object code; and transmit an alert notification to the computing device of the user indicating that the first object code does not match the second object code.

In some embodiments, the at least one processing device is further configured to: retrieve, from the source code repository, the source code, wherein the source code is a software update for a software application.

In some embodiments, the software update is a production release.

In some embodiments, the first build machine is associated with a deployment of the software update to target systems having the software application installed thereon.

In another aspect, a computer program product for software compiler integrity verification, the computer program product comprising a non-transitory computer-readable medium comprising code causing a first apparatus to: retrieve, from a source code repository, a source code; process, using a first build machine, the source code, wherein processing further comprises compiling the source code into a first object code; process, using a second build machine, the source code, wherein processing further comprises compiling the source code into a second object code; initiate an integrity verification engine on the first object code and the second object code; decompile, using the integrity verification engine, the first object code to create a first decompiled object code; decompile, using the integrity verification engine, the second object code to create a second decompiled object code; compare the first decompiled object code with the second decompiled object code; determine that the first decompiled object code matches the second decompiled object code; and transmit an approval notification to a computing device of a user indicating that the first decompiled object code matches the second decompiled object code, wherein the second build machine is configured to operate in an isolated network environment with limited networking and access thereto.

In yet another aspect, a method for software compiler integrity verification is presented. The method comprising: retrieving, from a source code repository, a source code; processing, using a first build machine, the source code, wherein processing further comprises compiling the source code into a first object code; processing, using a second build machine, the source code, wherein processing further comprises compiling the source code into a second object code; initiating an integrity verification engine on the first object code and the second object code; decompiling, using the integrity verification engine, the first object code to create a first decompiled object code; decompiling, using the integrity verification engine, the second object code to create a second decompiled object code; comparing the first decompiled object code with the second decompiled object code; determine that the first decompiled object code matches the second decompiled object code; and transmitting an approval notification to a computing device of a user indicating that the first decompiled object code matches the second decompiled object code, wherein the second build machine is configured to operate in an isolated network environment with limited networking and access thereto.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
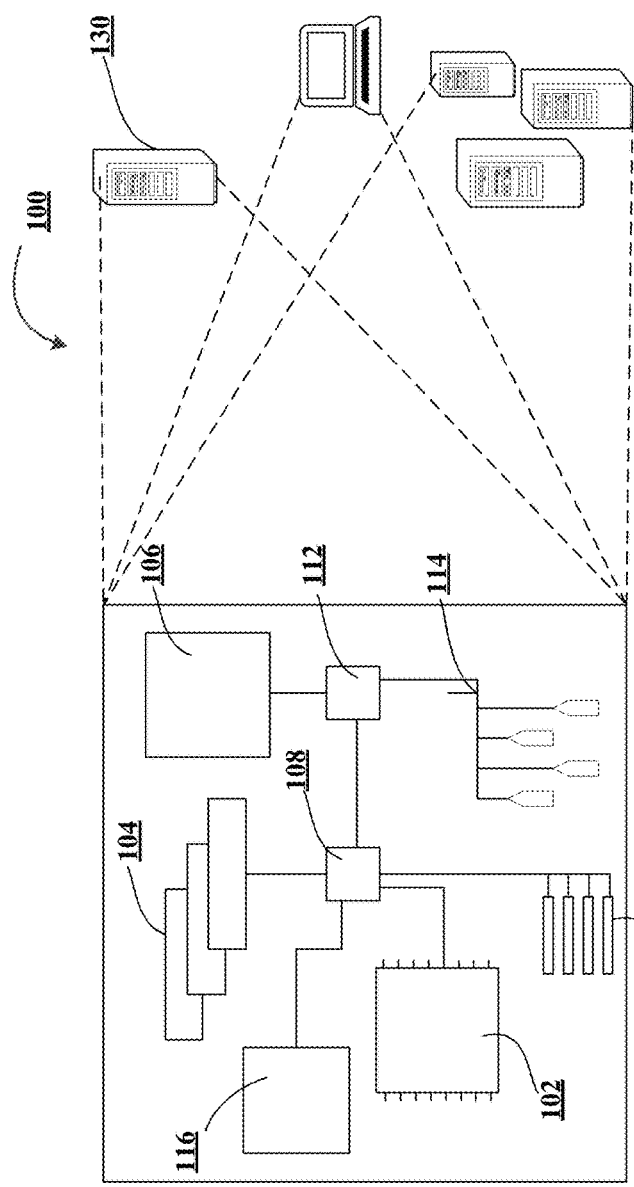
Figure 1:
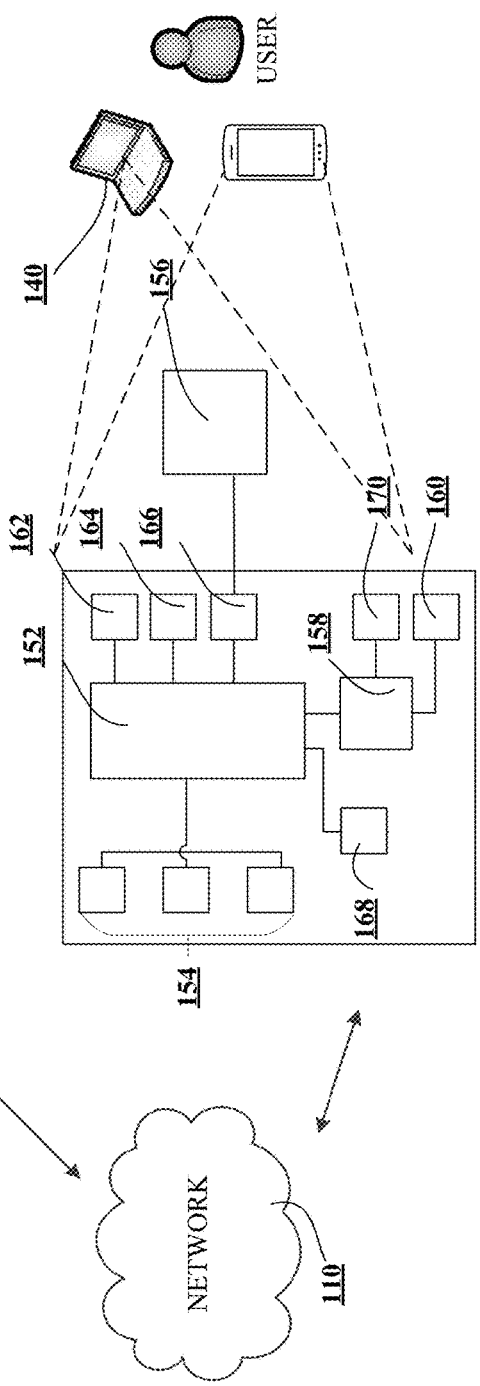
Figure 2:
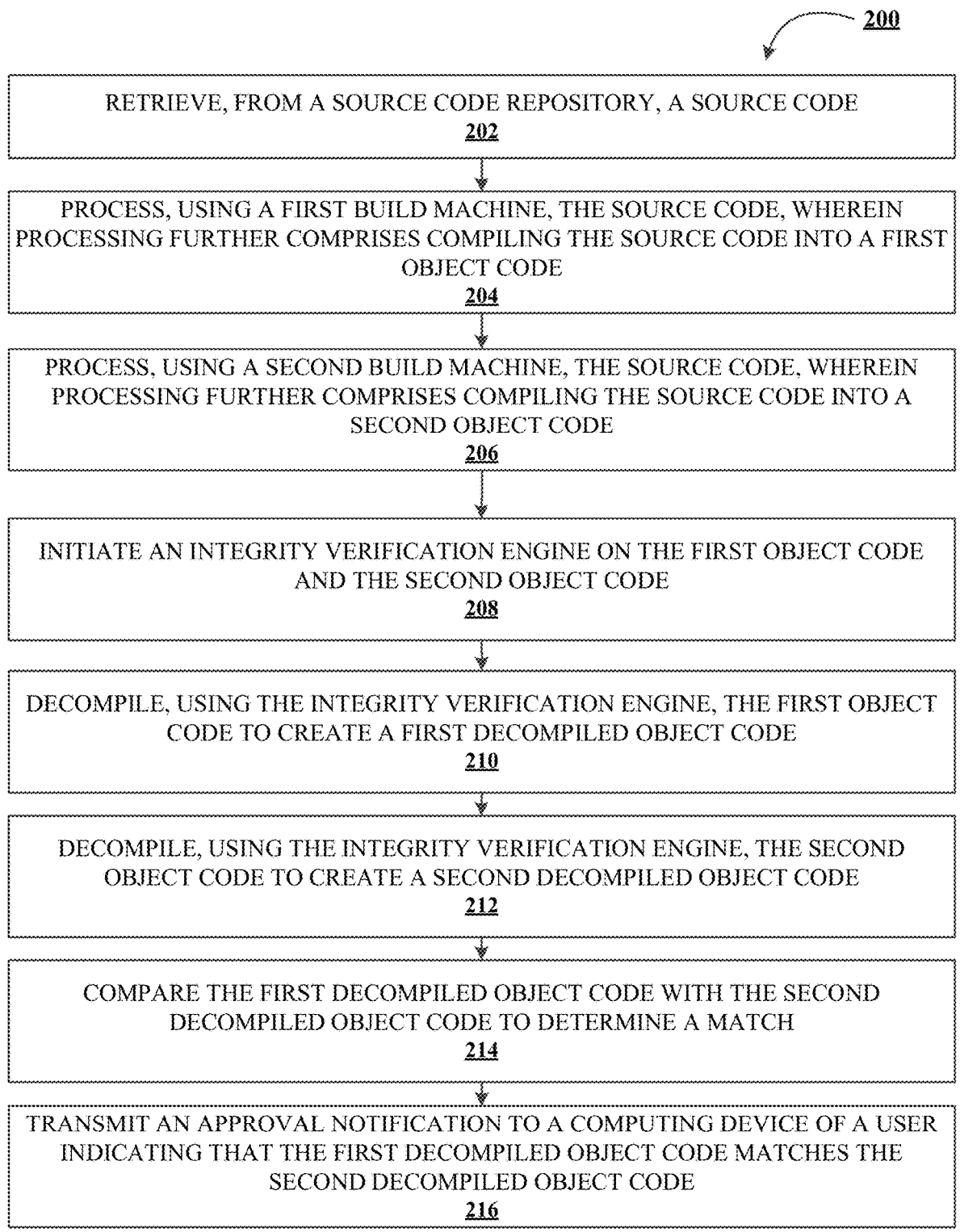
Figure 3:
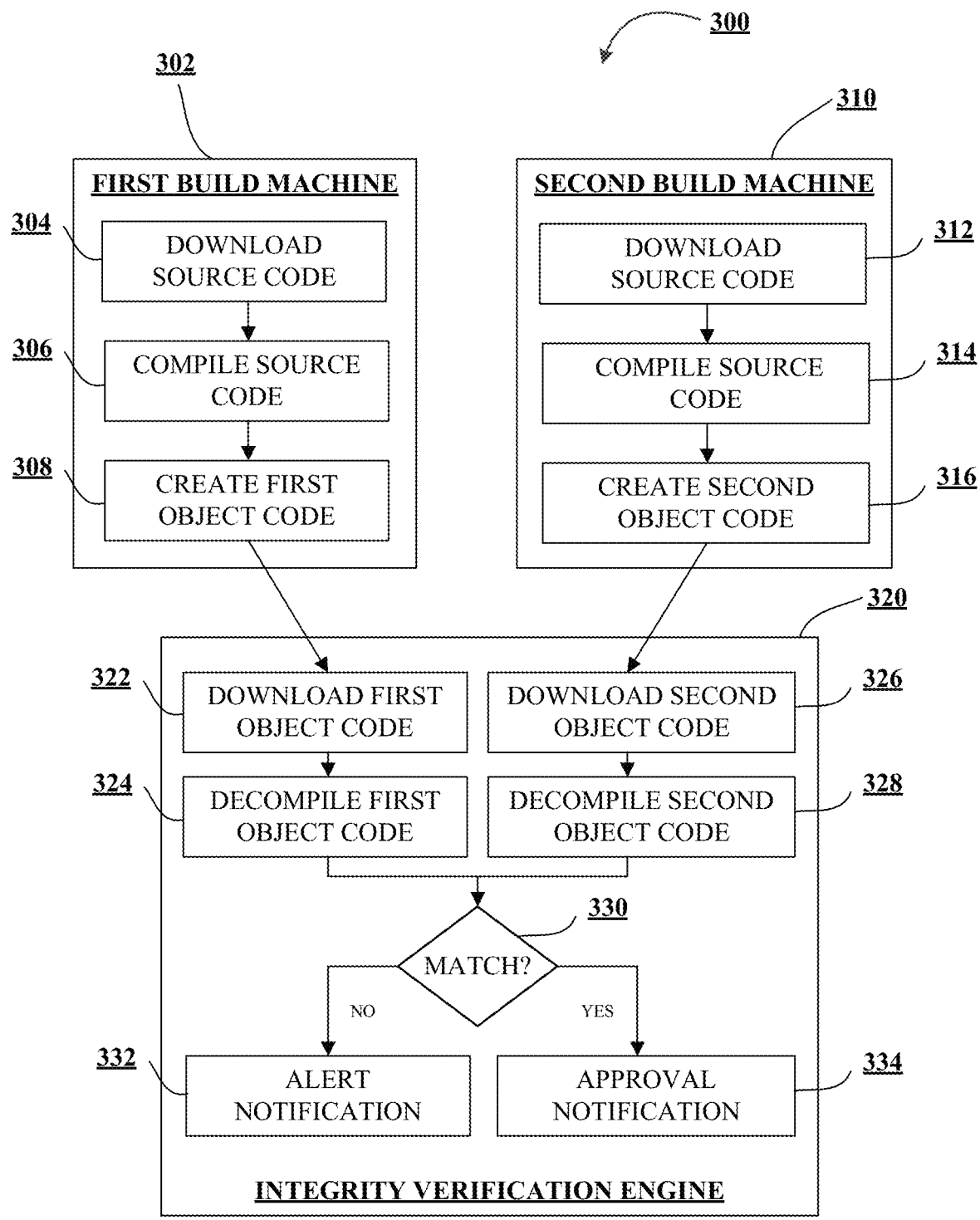

Having thus described embodiments of the invention in general terms, reference will now be made the accompanying drawings, wherein:

FIG. 1 illustrates technical components of a system for software compiler integrity verification, in accordance with an embodiment of the invention;

FIG. 2 illustrates a process flow for software compiler integrity verification, in accordance with an embodiment of the invention;

FIG. 3 illustrates a data flow diagram for software compiler integrity verification, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

Most software testing, including source code security and integrity testing, implemented during the software developmental lifecycle happens earlier in the development lifecycle. This is done so that development teams may be able to discover significant problems, including architectural flaws in the source code before they become too expensive to fix. However, implementing source code security and integrity testing earlier in the development lifecycle may leave the source code vulnerable to misappropriation during later stages of the development lifecycle, such as the code compilation process.

The present invention provides the functional benefit of implementing an integrity verification engine to analyze the source code after it has been compiled by a networked build machine (first build machine). To this end, the present invention uses an identical build machine (second build machine) that is otherwise isolated within the system environment with limited access to compile the source code to create an object code. The compilation procedure implemented by the isolated build machine is identical to the compilation procedure implemented by the networked build machine. The object code created by the isolated build machine is used as the ground truth to evaluate the object code created by the networked build machine. If the two object codes match, it is an indication that the compilation process implemented by the networked build machine is secure. If the two object codes do not match, it is an indication that undesirable code has been inserted into the source code during the compilation process implemented by the networked build machine.

In addition, the present invention uses an integrity verification engine to determine whether the compilation process implemented by the networked build machine is secure. In this regard, the integrity verification engine is configured to implement an identical decompilation process on the object code created by the networked build machine and the object code created by the isolated build machine. The resulting decompiled object codes are compared to determine a match. Similarly, if the two object codes match, it is an indication that the compilation process implemented by the networked build machine is secure. If the two object codes do not match, it is an indication that undesirable code has been inserted into the source code during the compilation process implemented by the networked build machine.

FIG. 1 presents an exemplary block diagram of the system environment for software compiler integrity verification 100, in accordance with an embodiment of the invention. FIG. 1 provides a unique system that includes specialized servers and devices communicably linked across a distributive network of nodes required to perform the functions of the process flows described herein in accordance with embodiments of the present invention.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, electronic kiosk devices, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. Any communication between the system 130 and the user input system 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input system 140 (or any other computing devices) may provide the system 130 with permissioned to access the protected resources of the user input system 130 (or any other computing devices), which may include a GPS device, an image capturing component (e.g., camera), a microphone, a speaker, and/or any of the components described herein.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 130 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a process flow for software compiler integrity verification, in accordance with an embodiment of the invention. As shown in block 202, the process flow includes retrieving, from a source code repository, a source code. The source code may be any collection of code, with or without comments, written using a human-readable programming language, usually as plain text. In some embodiments, the source code may be a software update for a software application, operating system, or software suite that is intended to provide fixes for features or adds minor software enhancements and compatibility. In some other embodiments, the source code may be a software upgrade for a software application, operating system, or software suite that is intended to offer significant change or major improvement over the current version of the software application. In still other embodiments, the source code may be a portion of the software application itself.

In some embodiments, the source code may be at any stage of software development, such as alpha, beta, release candidate, stable release, production release, and/or the like. In one aspect, the source code may be at the stage of product stabilization where all product features have been designed, coded and tested through one or more beta cycles with no known showstopper-class bugs, and the development team has agreed that no new source code will be added to the release. The source code may have also passed all verifications and tests and is ready for production release where it will be deployed to target systems.

Next, as shown in block 204, the process flow includes processing, using a first build machine, the source code, wherein processing further comprises compiling the source code into a first object code. In some embodiments, the first build machine may be centralized, stable, and reliable device (e.g., build server) associated with the system that is capable of implementing continuous integration in the development and deployment of a software application, update, or upgrade. Accordingly, in some embodiments, the first build machine may be associated with a deployment of the source code (software application, software update, and/or software upgrade) to target systems. In one aspect, the first build machine may be capable of executing a number of end-to-end processes that involve distinct functions, including version control, code quality, and code compilation. Code compilation (or compiling) is the process in which the source code written in one programming language (source language) is translated, converted, or transformed into another language (target language). Typically, the compiling process is primarily used to translate source code from a high-level programming language to a lower-level programming language (e.g., assembly code, object code, binary code, or machine code) to create an executable program.

Next, as shown in block 206, the process flow includes processing, using a second build machine, the source code, wherein processing further comprises compiling the source code into a second object code. In some embodiments, the second build machine may be configured to have same or similar computing capabilities as the first build machine, in that, the second build machine may be capable of executing a number of end-to-end processes that involve distinct functions, including version control, code quality, and code compilation. However, unlike the first build machine, the second build machine may be configured to operate in an isolated configuration with limited networking and access thereto. By isolating the second build machine, the system may be configured to minimize the likelihood of the second build machine being compromised by malicious actors. Furthermore, by establishing limited access to the second build machine, the system may be configured to ensure the integrity of the processes (such as compilation process) being executed by the second build machine.

Next, as shown in block 208, the process flow includes initiating an integrity verification engine on the first object code and the second object code. In some embodiments, the integrity verification engine may be configured to implement validation routines that check for correctness, meaningfulness, and security of the source code that are input to the engine. In this regard, the integrity verification engine may be configured to receive the first object code from the first build machine and the second object code from the second build machine as inputs to determine whether the source code has been exposed to misappropriate activity.

Next, as shown in block 210, the process flow includes decompiling, using the integrity verification engine, the first object code to create a first decompiled object code. In some embodiments, the integrity verification engine may be configured to implement a decompilation process that is capable of taking an executable file (e.g., first object code) as input, to create a high level source file (e.g., first decompiled object code) as output which can be recompiled successfully. By decompiling the first object code, the system may be configured to create the first decompiled object code.

Next, as shown in block 212, the process flow includes decompiling, using the integrity verification engine, the second object code to create a second decompiled object code. Similar to decompiling the first object code, the system may be configured to create the second decompiled object code by decompiling the second object code.

Next, as shown in block 214, the process flow includes comparing the first decompiled object code with the second decompiled object code to determine a match. In some embodiments, the system may be configured to determine that the first decompiled object code matches the second decompiled object code using the integrity verification engine. If the source code is not altered or modified during the compilation process, the first decompiled object code and the second decompiled object code will match, confirming the integrity of the source code. In some embodiments, the decompilation process may not be able to perfectly reconstruct the original source code, and as such, may produce obfuscated code. However, since the integrity verification engine implements identical decompilation process on both the first object code and the second object code, any obfuscated code that is generated will not compromise the matching process. If the source code is not altered or modified, any obfuscated code generated in the first decompiled object code and the second decompiled object code will also match.

Next, as shown in block 216, the process flow includes transmitting an approval notification to a computing device of a user indicating that the first decompiled object code matches the second decompiled object code. In some embodiments, the approval notification is an indication that that the compilation process implemented by the first build machine is secure.

In some embodiments, the system may be configured to determine that the first decompiled object code does not match the second decompiled object code. In response, the system may be configured to transmit an alert notification to the computing device of the user indicating that the first decompiled object code does not match the second decompiled object code. In some embodiments, the alert notification is an indication that undesirable code has been inserted into the source code during the compilation process implemented by the first build machine.

In some embodiments, the first object code and the second object code are in binary form. In such cases, system may be configured to compare, using the integrity verification engine, the binary codes of the first object code and the second object code to determine a match. If the binary codes match, the system may be configured to transmit the approval notification to the computing device of the user indicating that the first object code matches the second object code, signifying that that the compilation process implemented by the first build machine is secure. On the other hand, if the binary codes do not match, the system may be configured to transmit an alert notification to the computing device of the user indicating that the first object code does not match the second object code, signifying that undesirable code has been inserted into the source code during the compilation process implemented by the first build machine.

FIG. 3 illustrates a data flow diagram for software compiler integrity verification, in accordance with an embodiment of the invention. As shown in FIG. 3, the data flow diagram includes the first build machine 302, the second build machine 310, and the integrity verification engine 320. At step 304, the first build machine 302 downloads the source code from the source code repository. At step 306, the first build machine 302 compiles the source code. At step 308, the first build machine 302 creates the first object code. Similarly, at step 312, the second build machine 310 downloads the same source code from the source repository. At step 314, the second build machine 310 compiles the source code. At step 310, the second build machine 310 creates the second object code.

Once the first object code and the second object code are created at steps 308 and 316, the integrity verification engine 320 initiated to verify the integrity of the source code. At step 322, the integrity verification engine 320 downloads the first object code. At step 324, the integrity verification engine 320 decompiles the first object code to create a first decompiled object code. Similarly, at step 326, the integrity verification engine 320 downloads the second object code. At step 328, the integrity verification engine 320 decompiles the second object code to create a second decompiled object code. At step 330, the integrity verification engine 320 compares the first decompiled object code and the second decompiled object code to determine a match. If there is a match, the integrity verification engine 320 is configured to transmit an approval notification to the computing device of the user, as shown in step 334. On the other hand, if there is a mismatch, the integrity verification engine 320 is configured to transmit an alert notification to the computing device of the user, as shown in step 332.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for software compiler integrity verification, the system comprising:
   at least one non-transitory storage device; and
   at least one processing device coupled to the at least one non-transitory storage device, wherein the at least one processing device is configured to:
   retrieve, from a source code repository, a source code;
   process, using a first build machine, the source code, wherein processing further comprises compiling the source code into a first object code;
   process, using a second build machine, the source code, wherein processing further comprises compiling the source code into a second object code;
   initiate an integrity verification engine on the first object code and the second object code;
   decompile, using the integrity verification engine, the first object code to create a first decompiled object code;
   decompile, using the integrity verification engine, the second object code to create a second decompiled object code;
   compare the first decompiled object code with the second decompiled object code;
   determine that the first decompiled object code matches the second decompiled object code;
   determine that the source code has not been compromised during the compilation and decompilation process based on at least determining that the first decompiled object code matches the second decompiled object code;
   determine that the first build machine is secure based on at least determining that the first decompiled object code matches the second decompiled object code; and
   transmit an approval notification to a computing device of a user indicating that the source code has not been compromised during the compilation and decompilation process,
   wherein the second build machine is configured to operate in an isolated network environment with limited networking and access thereto to minimize a likelihood of the second build machine to be compromised by malicious actors.

2. The system of claim 1, wherein the at least one processing device is further configured to:
   determine that the first decompiled object code does not match the second decompiled object code; and
   transmit an alert notification to the computing device of the user indicating that the first decompiled object code does not match the second decompiled object code.

3. The system of claim 1, wherein the at least one processing device is further configured to:
   compare the first object code with the second object code, wherein the first object code and the second object code are in binary form;
   determine a match between the first object code and the second object code; and
   transmit the approval notification to the computing device of the user indicating that the first object code matches the second object code.

4. The system of claim 3, wherein the at least one processing device is further configured to:
   determine that the first object code does not match the second object code; and
   transmit an alert notification to the computing device of the user indicating that the first object code does not match the second object code.

5. The system of claim 1, wherein the at least one processing device is further configured to:
   retrieve, from the source code repository, the source code, wherein the source code is a software update for a software application.

6. The system of claim 5, wherein the software update is a production release.

7. The system of claim 6, wherein the first build machine is associated with a deployment of the software update to target systems having the software application installed thereon.

8. A computer program product for software compiler integrity verification, the computer program product comprising a non-transitory computer-readable medium comprising code causing a first apparatus to:

retrieve, from a source code repository, a source code;

process, using a first build machine, the source code, wherein processing further comprises compiling the source code into a first object code;

process, using a second build machine, the source code, wherein processing further comprises compiling the source code into a second object code;

initiate an integrity verification engine on the first object code and the second object code;

decompile, using the integrity verification engine, the first object code to create a first decompiled object code;

decompile, using the integrity verification engine, the second object code to create a second decompiled object code;

compare the first decompiled object code with the second decompiled object code;

determine that the first decompiled object code matches the second decompiled object code;

determine that the first build machine is secure based on at least determining that the first decompiled object code matches the second decompiled object code; and transmit an approval notification to a computing device of a user indicating that the source code has not been compromised during the compilation and decompilation process, wherein the second build machine is configured to operate in an isolated network environment with limited networking and access thereto to minimize a likelihood of the second build machine to be compromised by malicious actors.

9. The computer program product of claim 8, wherein the first apparatus is further configured to:

determine that the first decompiled object code does not match the second decompiled object code; and transmit an alert notification to the computing device of the user indicating that the first decompiled object code does not match the second decompiled object code.

10. The computer program product of claim 8, wherein the first apparatus is further configured to:

compare the first object code with the second object code, wherein the first object code and the second object code are in binary form;

determine a match between the first object code and the second object code; and transmit the approval notification to the computing device of the user indicating that the first object code matches the second object code.

11. The computer program product of claim 10, wherein the first apparatus is further configured to:

determine that the first object code does not match the second object code; and transmit an alert notification to the computing device of the user indicating that the first object code does not match the second object code.

12. The computer program product of claim 8, wherein the first apparatus is further configured to:

retrieve, from the source code repository, the source code, wherein the source code is a software update for a software application.

13. The computer program product of claim 12, wherein the software update is a production release.

14. The computer program product of claim 13, wherein the first build machine is associated with a deployment of the software update to target systems having the software application installed thereon.

15. A method for software compiler integrity verification, the method comprising:

retrieving, from a source code repository, a source code;

processing, using a first build machine, the source code, wherein processing further comprises compiling the source code into a first object code;

processing, using a second build machine, the source code, wherein processing further comprises compiling the source code into a second object code;

initiating an integrity verification engine on the first object code and the second object code;

decompiling, using the integrity verification engine, the first object code to create a first decompiled object code;

decompiling, using the integrity verification engine, the second object code to create a second decompiled object code;

comparing the first decompiled object code with the second decompiled object code;

determining that the first decompiled object code matches the second decompiled object code;

determining that the first build machine is secure based on at least determining that the first decompiled object code matches the second decompiled object code; and transmitting an approval notification to a computing device of a user indicating that the source code has not been compromised during the compilation and decompilation process, wherein the second build machine is configured to operate in an isolated network environment with limited networking and access thereto to minimize a likelihood of the second build machine to be compromised by malicious actors.

16. The method of claim 15, wherein the method further comprises:

determining that the first decompiled object code does not match the second decompiled object code; and transmitting an alert notification to the computing device of the user indicating that the first decompiled object code does not match the second decompiled object code.

17. The method of claim 15, wherein the method further comprises:

comparing the first object code with the second object code, wherein the first object code and the second object code are in binary form;

determining a match between the first object code and the second object code; and transmitting the approval notification to the computing device of the user indicating that the first object code matches the second object code.

18. The method of claim 17, wherein the method further comprises:

determining that the first object code does not match the second object code; and transmitting an alert notification to the computing device of the user indicating that the first object code does not match the second object code.

19. The method of claim 18, wherein the method further comprises:

retrieving, from the source code repository, the source code, wherein the source code is a software update for a software application.

20. The method of claim 19, wherein the software update is a production release.

* * * * *